United States Patent
Wu et al.

(10) Patent No.: US 9,160,382 B2
(45) Date of Patent: Oct. 13, 2015

(54) PHASE NOISE MITIGATION FOR WIRELESS COMMUNICATIONS

(71) Applicant: BlackBerry Limited, Waterloo (CA)

(72) Inventors: Huan Wu, Ottawa (CA); Daniel Noel Badiere, Ottawa (CA); Shouxing Qu, Gloucester, CA (US); Yan Xin, Kanata (CA); Arnold Sheynman, Northbrook, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/048,473

(22) Filed: Oct. 8, 2013

(65) Prior Publication Data

US 2015/0098535 A1 Apr. 9, 2015

(51) Int. Cl.
*H04B 1/10* (2006.01)
*H04L 27/00* (2006.01)
*H04L 27/38* (2006.01)

(52) U.S. Cl.
CPC .......... *H04B 1/1027* (2013.01); *H04L 27/0014* (2013.01); *H04L 27/38* (2013.01)

(58) Field of Classification Search
CPC ............ H04L 27/2662; H04L 27/2675; H04L 27/2679; H04L 1/0036; H04L 27/2272; H04L 27/2659; H04L 27/266; H04L 27/2673; H04L 27/2695; H04L 27/2657; H04L 25/03281; H04L 25/08; H04L 27/2613; H04L 27/2649; H04L 27/265; H04L 27/2685; H04L 27/2688; H04W 28/14; H04W 72/046; H04W 84/12; H04B 1/0003; H04B 1/16; H04B 1/1027
See application file for complete search history.

(56) References Cited

U.S. PATENT DOCUMENTS

| | | | |
|---|---|---|---|
| 4,320,526 | A | 3/1982 | Gitlin |
| 4,639,939 | A | 1/1987 | Hirosaki et al. |

(Continued)

FOREIGN PATENT DOCUMENTS

FR 2871633 12/2005

OTHER PUBLICATIONS

IEEE Computer Society, Wireless LAN Medium Access Control (MAC) and Physical Layer (PHY) Specifications, IEEE Std 802.11ad™, IEEE, Dec. 28, 2012.

(Continued)

*Primary Examiner* — Hirdepal Singh
(74) *Attorney, Agent, or Firm* — Thomas Grzesik; Fleit Gibbons Gutman Bongini & Bianco P.L.

(57) ABSTRACT

A method and apparatus for tracking and mitigating phase noise in a communication receiver are disclosed. The phase noise tracking and mitigation apparatus operates in a recursive manner and includes a quantizer for determining data symbols from noise-compensated input values, a phase noise estimator for determining raw phase noise values from the data symbols and a first sequence of uncompensated input values, an error concealment module for removing unreliable samples from the raw phase noise values, a filter operable to filter the raw phase noise values to produce filtered phase noise values, and a phase-noise compensator for determining noise-compensated output values dependent upon the filtered phase noise values and the first sequence of uncompensated input values. Filter coefficients, and initial noise-compensated input values are determined from one or more second sequences of uncompensated input values corresponding to known symbols corrupted by phase noise.

18 Claims, 9 Drawing Sheets

(56) References Cited

U.S. PATENT DOCUMENTS

| | | | |
|---|---|---|---|
| 4,792,964 | A | 12/1988 | Yoshida |
| 4,849,996 | A | 7/1989 | Kamerman |
| 4,985,900 | A | 1/1991 | Rhind et al. |
| 5,031,195 | A | 7/1991 | Chevillat et al. |
| 5,084,902 | A | 1/1992 | Aotani et al. |
| 5,115,452 | A | 5/1992 | Cupo |
| 5,128,968 | A | 7/1992 | Yoshida |
| 5,497,400 | A | 3/1996 | Carson et al. |
| 5,579,351 | A | 11/1996 | Kim |
| 6,647,071 | B2 * | 11/2003 | Sommer et al. ............ 375/285 |
| 7,050,522 | B2 | 5/2006 | Schmatz |
| 7,286,506 | B2 | 10/2007 | Abrishamkar et al. |
| 7,457,366 | B2 | 11/2008 | Maltsev et al. |
| 7,609,789 | B2 | 10/2009 | Leshem |
| 7,668,269 | B2 | 2/2010 | Ma et al. |
| 7,817,736 | B2 | 10/2010 | Gunturi et al. |
| 7,929,928 | B2 | 4/2011 | Babitch et al. |
| 8,144,827 | B2 | 3/2012 | Fung et al. |
| 8,379,752 | B2 | 2/2013 | Kleider et al. |
| 8,390,349 | B1 * | 3/2013 | Ravi et al. .................. 327/156 |
| 8,483,856 | B2 * | 7/2013 | Hezar et al. .................. 700/94 |
| 8,537,285 | B2 * | 9/2013 | Silver et al. ................ 348/731 |
| 8,938,037 | B1 * | 1/2015 | Fard et al. .................. 375/345 |
| 2003/0086515 | A1 * | 5/2003 | Trans et al. ................ 375/346 |
| 2012/0114070 | A1 * | 5/2012 | Choi et al. .................. 375/295 |
| 2014/0023155 | A1 * | 1/2014 | Khoryaev et al. ........... 375/260 |
| 2014/0211889 | A1 * | 7/2014 | Arambepola et al. ....... 375/340 |
| 2014/0306774 | A1 * | 10/2014 | Atsumi .................. 331/177 R |

OTHER PUBLICATIONS

Hewlett Packard, Understanding and Measuring Phase Noise in the Frequency Domain, Application Note 207, Part No. 5952-8708, Oct. 1, 1976.

Engel, G., The Power Spectral Density of Phase Noise and Jitter: Theory, Data analysis, and Experimental Results, Application Note AN-1067, Apr. 1, 2010.

IEEE, IEE Standard Definitions of Physical Quantities for Fundamental Frequency and Time Metrology, IEEE Std 1139-1988, Apr. 28, 1989.

Petrovic D., Rave, W., Fettweis, G., Effects of Phase Boise on OFDM Systems with and without PLL: Characterization and Compensation, IEE Transactions on Communications, vol. 55, No. 8, Aug. 1, 2007.

Simon, V.; Senst, A.; Speth, M.; Meyr, H., "Phase noise estimation via adapted interpolation," Global Telecommunications Conference, 2001. Globecom '01. IEEE, vol. 6, No., pp. 3297,3301 vol. 6, 2001.

Bittner, S.; Frotzscher, A.; Fettweis, G.; Deng, E., "Oscillator Phase Noise compensation using Kalman tracking," Acoustics, Speech and Signal Processing, 2009. ICASSP 2009. IEEE International Conference on , vol., No., pp. 2529,2532, Apr. 19-24, 2009.

Yu Wang; Falconer, D., "Phase Noise Estimation and Suppression for Single Carrier SDMA Uplink," Wireless Communications and Networking Conference (WCNC), 2010 IEEE , vol., No., pp. 1,6, Apr. 18-21, 2010.

Suyama, S.; Miyai, Y.; Suzuki, H.; Fukawa, K., "Experimental evaluation of phase noise compensation for 60-GHz single carrier systems," Wireless Technology Conference (EuWIT), 2010 European , vol., No., pp. 289,292, Sep. 27-28, 2010.

Asim, M.; Ghogho, M.; McLernon, D., "Mitigation of phase noise in single carrier frequency domain equalization systems," Wireless Communications and Networking Conference (WCNC), 2012 IEEE , vol., No., pp. 920,924, Apr. 1-4, 2012.

Therrien, C.W., "Some observations about centralized linear prediction," Signals, Systems, and Computers, 1999. Conference Record of the Thirty-Third Asilomar Conference on , vol. 1, No., pp. 466,469 vol. 1, Oct. 24-27, 1999.

Nguyen, L.K.; Wells, R.B., "Phase and amplitude jitter cancellation using 1-step LMS linear predictor," *Military Communications Conference, 2008. MILCOM 2008. IEEE* , vol., No., pp. 1,7, Nov. 16-19, 2008.

Ferrari, G.; Colavolpe, G.; Raheli, R., "On Linear Predictive Detection for Communications With Phase Noise and Frequency Offset," Vehicular Technology, IEEE Transactions on , vol. 56, No. 4, pp. 2073,2085, Jul. 2007.

Baltersee, J.; Fock, G.; Schulz-Rittich, P.; Meyr, H., "Performance analysis of phasor estimation algorithms for a FDD-UMTS RAKE receiver," Spread Spectrum Techniques and Applications, 2000 IEEE Sixth International Symposium on , vol. 2, No., pp. 476,480 vol. 2, 2000.

Zeidler, J.R., "Performance analysis of LMS adaptive prediction filters," Proceedings of the IEEE , vol. 78, No. 12, pp. 1781,1806, Dec. 1990.

EESR dated Feb. 4, 2015 received for European Application No. 14188012.0.

Suyama, S., et al., "Iterative receiver employing phase noise compensation and channel estimation for millimeter-wave OFDM Systems," IEEE Journal of Selected Areas in Communications, Oct. 1, 2009, pp. 1358-1366, vol. 27, No. 08.

* cited by examiner

PHASE NOISE MITIGATION FOR WIRELESS COMMUNICATIONS

BACKGROUND

Wireless communication in millimetre wave radio frequency bands (mmWave) provides data communication at rates of multi-gigabits per second. An example of the application is described in the IEEE 802.11ad specification for a very high throughput Wireless Local Area Network (WLAN) in the 60 GHz band. Along with the benefits and potentials of communication in mmWave bands, come many challenges in hardware, software and system engineering. Phase noise is one of the prominent challenges associated with hardware impairments in both transmitters and receivers.

Wireless communication devices utilize local oscillators that provide frequency and timing signals. Phase noise is produced by phase instability, which is inherent to all local oscillators, and may be the limiting factor for the link performance of high-order modulation and coding schemes.

A variety of phase noise receiver-based mitigation schemes has been presented, but many schemes are impractical for application in single-chip RF transceivers that are developed for mobile applications with low cost, low power consumption and small footprint requirements. Some schemes assume prior knowledge of statistical properties of the phase noise, which may not be available in advance and may change with the time. Some schemes rely on decision feedback from a channel decoder and therefor introduce undesirable latency into the receiver. Other schemes use adaptive filters, such as Kalman filters, that have high complexity and risk instability. Simpler schemes, such as those based on linear interpolation, have reduced performance.

It would be useful to provide a method and apparatus for phase mitigation that is computationally efficient, robust, does not introduce excessive latency and does not require advance knowledge of phase noise characteristics.

BRIEF DESCRIPTION OF THE DRAWINGS

Exemplary embodiments of the present disclosure will be described below with reference to the included drawings such that like reference numerals refer to like elements and in which.

DETAILED DESCRIPTION

The present embodiments include a method and apparatus for tracking and mitigating phase noise in a communication receiver. The phase noise tracking and mitigation apparatus operates in a recursive manner and includes a quantizer (hard decision module) for determining data symbols from noise-compensated input values, a phase noise estimator for determining raw phase noise values from the data symbols and a first sequence of uncompensated input values, an error concealment module for removing unreliable samples from the raw phase noise values, a filter operable to filter the raw phase noise values to produce filtered phase noise values, and a phase-noise compensator for determining noise-compensated output values dependent upon the filtered phase noise values and the first sequence of uncompensated input values. Filter coefficients and initial noise-compensated input values are determined from one or more second sequences of uncompensated input values corresponding to known symbols corrupted by phase noise.

In general, the growing interest of wireless communications in millimetre wave radio frequency bands (mm-wave) is due to the market demand of higher data rate at multi-gigabits per second and the availability of wide bandwidth in mmWave frequency bands. An example of the application is the IEEE 802.11ad for very high throughput WLAN in the 60 GHz band. Along with the benefits and potentials in mm-wave bands, it comes with many challenges in hardware, software and system engineering.

The present embodiments concern, inter alia, the mitigation of phase noise impact on the link performance of wireless communications in mm-wave radio frequency bands. The focus may be, at least in part, on mitigation methods in receivers in time domain where some data patterns—known to both the transmitter and the receiver, such as pilot or training signals—are available and dispersed in data streams. The objectives include reducing the impact of the phase noise and improving the link performance, especially for higher order modulations, such as 16QAM.

Figure 1:
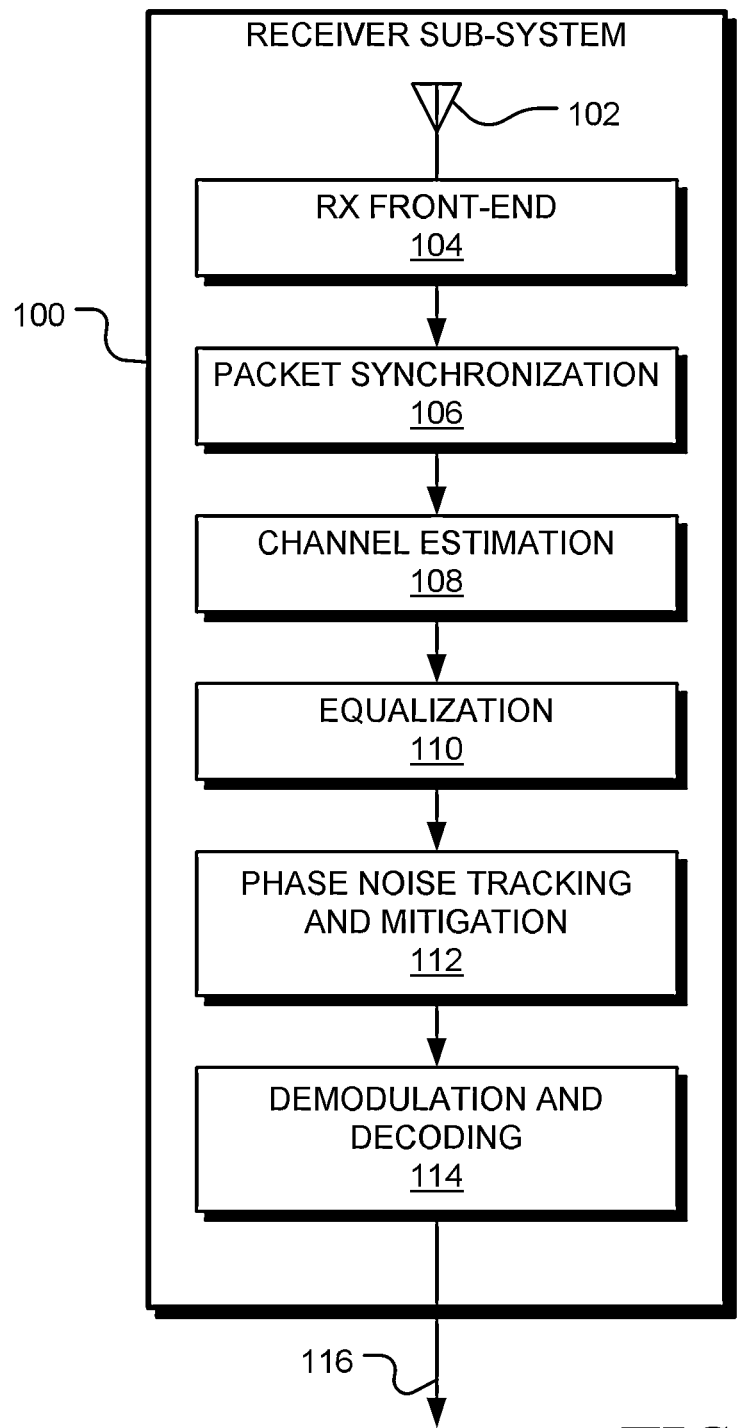
FIG. 1 is a block diagram of a communications system, in accordance with exemplary embodiments of the present disclosure.

The present embodiments may provide a phase noise tracking and mitigating method that operates in a receiver. The exemplary positioning of the method in a receiving chain is shown in FIG. 1.

In one aspect, the method may perform operations on the symbols after channel equalization and may employ a joint forward and backward linear prediction filter (JFBLPF) to generate the phase noise estimation for each of the data symbols. The method may estimate the covariance matrix of the phase noise samples from the known signal parts (e.g., the GIs (guard intervals) in the 802.11ad case) of a data packet so that it does not require any a priori knowledge of the stochastic property of the phase noise (e.g., the power spectral density (PSD) or the specific random process).

The JFBLPF coefficients may be computed from the estimated covariance matrix. The JFBLPF may be used to operate on some "raw and noisy" phase noise samples from the data symbols and to generate the refined phase noise estimation for each of the data symbols. The "raw and noisy" phase noise samples may be generated by applying a symbol hard decision on each of the data symbols and, as a result, they may be subject to hard decision errors, equalization residuals and AWGN. The hard decisions may be made for the data symbols based upon the soft symbols output of the equalizer. To reduce the number of hard decision errors, the soft symbols may be first processed by any coarse phase reduction method, such as linear interpolation.

The phase noise samples may be further processed by an error detection and concealing method such that the unreliable phase noise samples are replaced by some neutral values and then interpolated with their neighboring samples. The phase noise may then be removed or reduced from the data symbols by the refined phase noise estimation.

Figure 2:
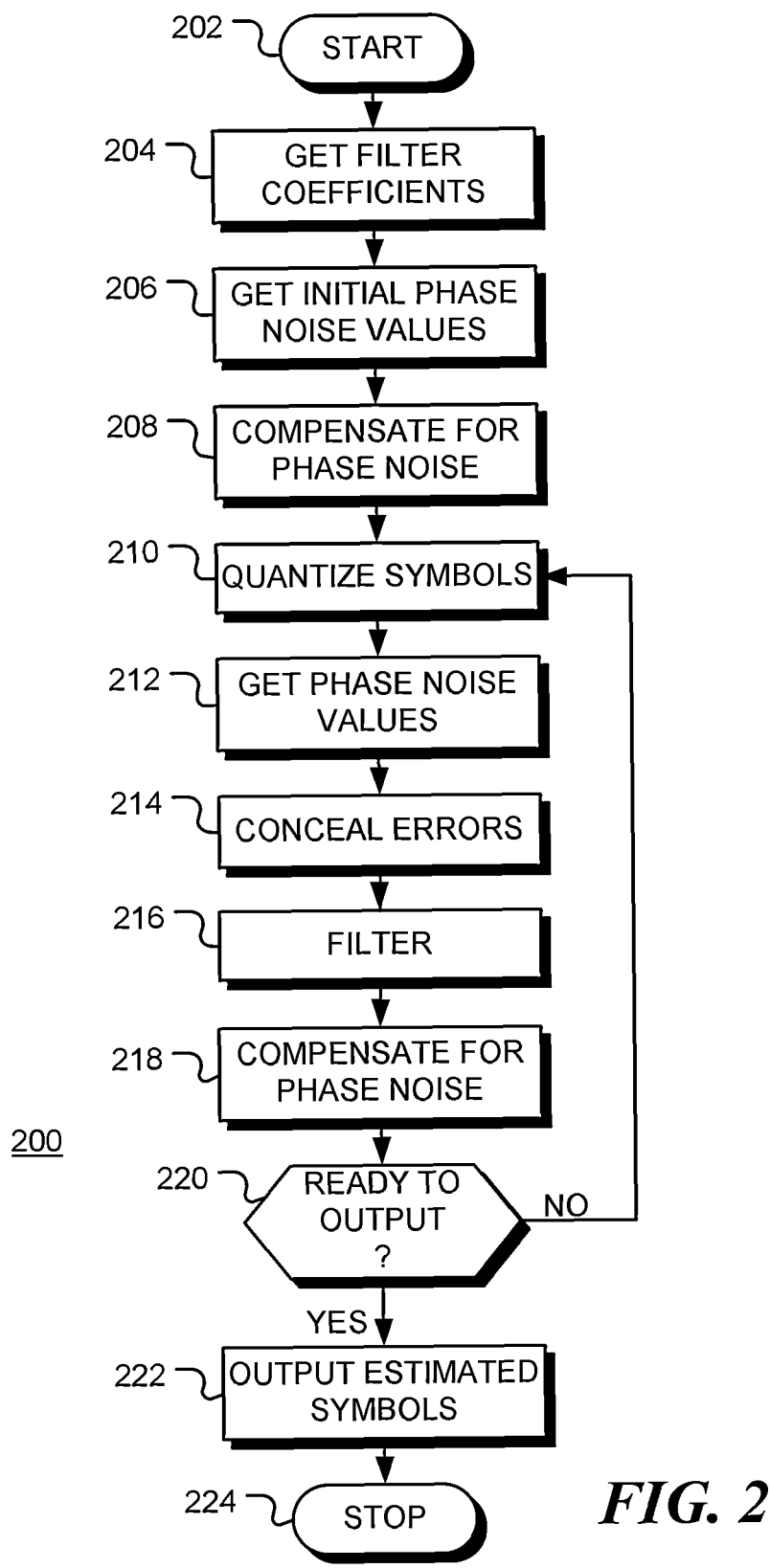
FIG. 2 is a flow chart of a method for phase noise tracking and mitigation, in accordance with exemplary embodiments of the invention.

Part of the processing in the method, as shown in FIG. 2, may be repeated for a number of iterations until some termination criteria are satisfied. The termination criteria may be based on rules that indicate no significant improvement may be seen from the previous iteration. Note that the iterations in the proposed method may be contained within itself and does not include other processing units, such as the equalizer, channel decoder, etc., in the receiving chain. Therefore, the extra processing latency may be minimal.

The details of the exemplary method are discussed further below. The implementation and computation complexity of the method may be alleviated by several considerations. First, computation of the coefficients of the linear prediction filter JFBLPF may be greatly reduced by considering the symmetry property of the JFBLPF and using the block matrix inversion rules. Simulations show that the dimension of the block matrices may be as low as 3 to achieve a satisfactory performance for practical phase noise models.

The computation may be further reduced by using two separate linear predictive filters (LPFs), a forward LPF (F-LPF) and a backward LPF (B-LPF), called FB-LPF, with minor performance loss.

Another consideration for the complexity reduction may relate to the manner of retrieving the phase noise samples from the data symbols. Retrieving in the phasor domain may be advantageous over retrieving in the phase domain because the former does not require the computation of trigonometric functions before and after the LPF.

Finally the method may only be invoked for certain higher order modulation and coding schemes, and the coarse phase noise reduction (LINT) might be sufficient for lower order modulation and coding schemes (MCS's).

In one embodiment, a method of phase noise mitigation in a wireless communications system may be provided. The method may include receiving a wireless transmission at a receiver, the wireless transmission having a known data part, e.g., guard interval, in each data block. The method may also include estimating and tracking phase noise autocorrelations for the data block at the receiver based upon the known data part such that the receiver mitigates impact of phase noise on the received transmission with no prior knowledge about phase noise characteristics of the received transmission.

In another embodiment, a method of phase noise mitigation in a wireless communications system may be provided. The method may include for a transmission received at a receiver from a remote transmitter, (a) data packet synchronization; (b) channel estimation; (c) equalization; (d) phase noise tracking and mitigation; and (e) demodulation and decoding. The phase noise tracking and mitigation may use an iterative process to eliminate phase noise from both the remote transmitter and the receiver without employing prior stochastic information about the phase noise.

I. Phase Noise

Phase noise occurs in both the transmitter and the receiver of any wireless communication device. It becomes more severe and prominent in high-rate communication links, such as links utilizing mmWave radio frequency bands. Link performance, and the resulting system throughput, in mmWave or other high-rate links can be significantly degraded or even limited by the phase noise if it is left untreated. For example, computer simulations of an IEEE 802.11ad single-carrier physical (SC-PHY) link indicate that the degradation due to phase noise can be anywhere from a few decibels (dBs) for QPSK modulations to a total link failure for 16QAM modulations (where the degradation was measured as the signal-to-noise ratio (SNR) difference at the 1% packet error rate (PER), as required by the IEEE 802.11ad SC-PHY). A total link failure occurs when the required packet error rate (PER) cannot be reached with the increase of signal power.

Phase noise is commonly defined and measured in the frequency domain by the single sideband power spectral density (PSD) L(f) in unit of dBc/Hz. It has been shown that the PSD L(f) often grows quadratically with the carrier frequency, which makes the phase noise more significant in mmWave bands than in the 2~5 GHz frequency bands. Phase noise becomes even more challenging when using single-chip RF transceivers that are developed for mobile applications with low cost, low power consumption and small footprint requirements.

An output from the channel equalizer at sample index n may be written as $$y(n)=s(n)e^{j\phi(n)}+w(n), \qquad (1)$$

where s(n) is the data symbol at index n, φ(n) is a phase error, and w(n) is additive white Gaussian noise. The factor $e^{j\phi(n)}$ denotes a complex phase factor, referred to as a phasor and $j=\sqrt{-1}$. In the sequel, references to a phase noise sample or phase noise value is taken to reference either to the phase angle φ(n) or the complex phasor $e^{j\phi(n)}$ defined by that angle. An objective of the present disclosure is to provide a noise-compensate sample ŷ(n) from which the data symbol s(n) can be estimated more reliably. Thus, the input values to the phase-noise tracking and mitigation module comprise data symbols corrupted by phase noise and white noise. The input value at sample index n may be written as $$y(n)(e^{j\phi(n)}+w(n)/s(n))=s(n)\times(n), \qquad (2)$$

where x(n) is a complex phase noise value.

II. Phase Noise Mitigation

Aspects of the present disclosure relate to a method and apparatus for mitigating phase noise impairment of a wireless communication link, such as a link operable in a mmWave radio frequency band, for example. In one embodiment, phase noise from both a transmitter and a receiver is mitigated in a receiver through iterative use of prediction filters. The approach tracks variations in phase noise and does not require any prior knowledge of the PSD or other properties of the phase noise. Initial phase noise samples are retrieved from parts of the data input stream that contain known symbols.

The approach is applicable to both real-valued phase noise angles and complex phase noise phasors.

Efficient schemes for computing the coefficients of a phase noise filter are disclosed for embodiments using a joint forward and backward linear prediction filter (JFBLPF).

In exemplary embodiments, phase noise samples are retrieved for filtering by quantizing input data values that are initially processed by a coarse phase noise reduction process, such as linear interpolation.

An error concealment circuit or module may be used to reduce the number of outliers in phase noise samples for improved performance.

An iterative or recursive process is utilized that does not require the feedback from a channel decoder and does not include channel equalization or channel decoding functions. Further, the autocorrelation matrices and the linear prediction filter coefficients are calculated only once for each data block. The iterative process does not require re-calculation of them.

The mitigation is implemented in a receiver of a communication device and may utilize data sequences, such as pilot signals or training signals, that are known to both the transmitter and the receiver. These sequences are available and dispersed in data streams. For example, the mitigation may be applied in a receiver implementing a single-carrier physical layer (SC-PHY) defined in the specification IEEE 802.11ad, where guard intervals (GI's) with known Golay sequences are periodically inserted before and after the data blocks.

III. Exemplary Receiver Sub-System

FIG. 1 is a block diagram of an exemplary receiver sub-system 100 of a communication device. An antenna 102 is responsive to a radio signal and provides a signal to a receiver front-end 104. The receiver front-end 104 may include, for example, an impedance matching circuit, a radio frequency amplifier and a mixer that mixes the amplified signal with a signal from a local oscillator to produce an intermediate or zero frequency signal. Additional processing is provided by a packet synchronization module 106, a channel estimation module 108 and a channel equalizer 110. The output from the equalizer 110 is passed to a phase noise tracking and mitigation module 112, that mitigates the effects of phase noise in the equalized signal. The output from module 112 may then be used by subsequent processing modules, such as demodulation and decoding module 114 that produces output symbols 116. Thus, in this embodiment, the phase noise mitigation is performed after channel equalization. In one embodiment, phase noise tracking and mitigation module 112 utilizes a filter, such as a joint forward and backward linear prediction filter (JFBLPF), to generate the phase noise estimates for each of the input data values. The filter coefficients may be determined by various techniques. For example, the covariance matrix of the phase noise samples may be estimated from the known signal parts of a data packet (e.g., the GI's in a 802.11ad data packet) so no a priori knowledge is required of the stochastic property of the phase noise (e.g., the PSD or the specific random process). The filter coefficients can be computed from the estimated covariance matrix. The filter is used to operate on "raw" phase noise samples and generates the filtered phase noise estimation for each of the data symbols. The "raw" phase noise samples may be generated by making symbol hard decision on each of the data symbols. Consequently, the noise samples are subject to hard decision errors, equalization residuals and additive white Gaussian noise (AWGN). The hard decisions are made for the data symbols based on the soft symbols output of the equalization module 110. To reduce the number of hard decision errors, the soft symbols are first processed by a coarse phase reduction algorithm such as the linear interpolation. The phase noise samples may be further processed by an error detection and concealing algorithm, so that the unreliable phase noise samples are replaced by some neutral values and then interpolated with their neighbouring samples. The refined phase noise estimation is then used to reduce the phase noise in the input values.

The processing in the path in the phase noise tracking and mitigation module 112 may be repeated for a number of iterations until some termination criteria are satisfied. For example, a termination criterion can be based on a rule that no significant improvement can be seen from the previous iteration.

The phase noise tracking and mitigation module 112 is self-contained and does not include other processing units, such as the equalizer 110, channel decoder 114, etc., in the receiving chain. Therefore, the module does not introduce significant latency into the receiving path.

IV. Exemplary Method of Phase Tracking and Mitigation

FIG. 2 is a flow chart 200 of a method for phase noise tracking and mitigation in accordance with exemplary embodiments of the invention. Following start block 202, filter coefficients are estimated at block 204. The filter is designed to provide an improved estimate of the phase noise of a given input sample by acting on the phase noise samples received before or after the given input sample, or both before and after the given input sample. This approach is based on an assumption that neighboring phase-noise values are at least partially correlated with one another. Exemplary filter designs are described below. At block 206, initial phase noise values are determined. In one embodiment, the phase noise values are determined from input values corresponding to known symbols, such as pilot signals or cyclic prefixes. From equation (2), the phase noise values are given by $$x(n)=y(n)/s(n), \quad (3)$$

where s(n) is the known data symbol contained in the noisy input y(n). Equation (3) provides a complex phasor. A real phase angle may be determined as the argument of the phasor. Noise values for inputs having unknown data symbols may be estimated by, for example, linear interpolation between known phase noise values. This is discussed in more detail in reference to FIG. 3 below. At block 208, inputs values with unknown data symbols are phase compensated using the estimated phase noise values, to give compensated input values $$\hat{y}_0(n)=y(n)/\hat{x}_0(n), \quad (4)$$

where $\hat{x}_0(n)$ is the initial phase noise value. At block 210, the corresponding symbol $\hat{s}_0(n)$ is estimated using a hard decision or quantization. This operation is denoted by $$\hat{s}_0(n)=Q\{\hat{y}_0(n)\}. \quad (5)$$

The estimated symbol is used at block 212 to determine a raw phase value for the input using $$\hat{x}_{raw}(n)=y(n)/\hat{s}_0(n). \quad (6)$$

It is noted from equation (3) that the raw phase noise estimate $\hat{x}_{raw}(n)$ will be inaccurate if the estimated data symbol $\hat{s}(n)$ does not correspond to the actual symbol in the input value symbol s(n). Accordingly, large errors may be detected and concealed at block 214. For example, the magnitude of the error may be compared to a multiple of the standard deviation of other errors. If the magnitude is large, the phase noise value may be replaced interpolating between neighboring phase noise values. At block 216, a filtered phase noise estimate $\hat{x}_{filtered}(n)$ is determined by passing the raw phase noise estimates $\hat{x}_{raw}(n)$ through the filter designed at block 204. In one embodiment the filter is a joint forward and backward prediction filter and the filtered phase noise estimate $\hat{x}_{filtered}(n)$ is calculated as $$\hat{x}_{filtered}(n) = \sum_{m=1}^{M_1} a(m)\hat{x}_{raw}(n-m) + \sum_{m=1}^{M_2} b(m)\hat{x}_{raw}(n+m), \quad (7)$$

where $a(m)$ are $M_1$ forward prediction coefficients and $b(m)$ are $M_2$ backward prediction coefficients. Other filters may be used to estimate the filtered phase noise value. For example, infinite impulse response filters, lattice filters or non-linear filters may be used.

At block 218, input values with unknown data symbols are phase-compensated using the filtered phase noise values, to give compensated input values $$\hat{y}_1(n) = y(n)/\hat{x}_{filtered}(n), \quad (8)$$

where $\hat{x}_{filtered}(n)$ is the filtered phase noise value. The phase compensated values are ready for output, as depicted by the positive branch from decision block 220, the compensated values $\hat{y}(n)$ are output at block 222 and the processing terminates at block 224. For example, the compensated values may be passed to a demodulator and channel decoder. Otherwise, as depicted by the negative branch from decision block 220, flow returns to block 210 and the symbols are re-estimated from the compensated values $\hat{y}_1(n)$. This process may be repeated until the compensated values are deemed ready for output. For example, the process may be terminated when the re-estimated symbols are unchanged from a prior iteration of the process. At iteration $k$, the compensated input value is calculated from the previous phase noise value as $$\hat{y}_k(n) = y(n)/\hat{x}_{k,filtered}(n). \quad (9)$$

If the compensated input value is not ready for output, the data symbol is estimated from the compensated input value $\hat{y}_k(n)$ as $$\hat{s}_k(n) = Q\{\hat{y}_k(n)\} \quad (10)$$

The raw phase noise is updated as $$\hat{x}_{k+1,raw}(n) = y(n)/\hat{s}_k(n), \quad (11)$$

and, after concealment of large errors, the filtered phase noise is updated as $$\hat{x}_{k+1,filtered}(n) = \quad (12)$$

$$\sum_{m=1}^{M_1} a(m)\hat{x}_{k,raw}(n-m) + \sum_{m=1}^{M_2} b(m)\hat{x}_{k,raw}(n+m) = c^T x_k(n).$$

In equation (12), with $M_1 = M_2 = L$, the coefficient vector $c$ and data vector $x_k$ are defined as $$c = \begin{bmatrix} b(L) \\ b(L-1) \\ \vdots \\ b(1) \\ a(1) \\ a(2) \\ \vdots \\ a(L) \end{bmatrix} = \begin{bmatrix} b \\ a \end{bmatrix}, x_k(n) = \begin{bmatrix} x_k(n+L) \\ x_k(n+L-1) \\ \vdots \\ x_k(n+1) \\ x_k(n-1) \\ x_k(n-2) \\ \vdots \\ x_k(n-L) \end{bmatrix} \quad (13)$$

In this way, the phase noise estimate $\hat{x}_{k+1,filtered}(n)$ is improved at each iteration. Equivalently, the compensated input value $\hat{y}_k(n)$ is improved at each iteration. The steps are performed for each index n in a block or sequence of values.

A. Exemplary Initial Estimate of Phase Noise

Figure 3:
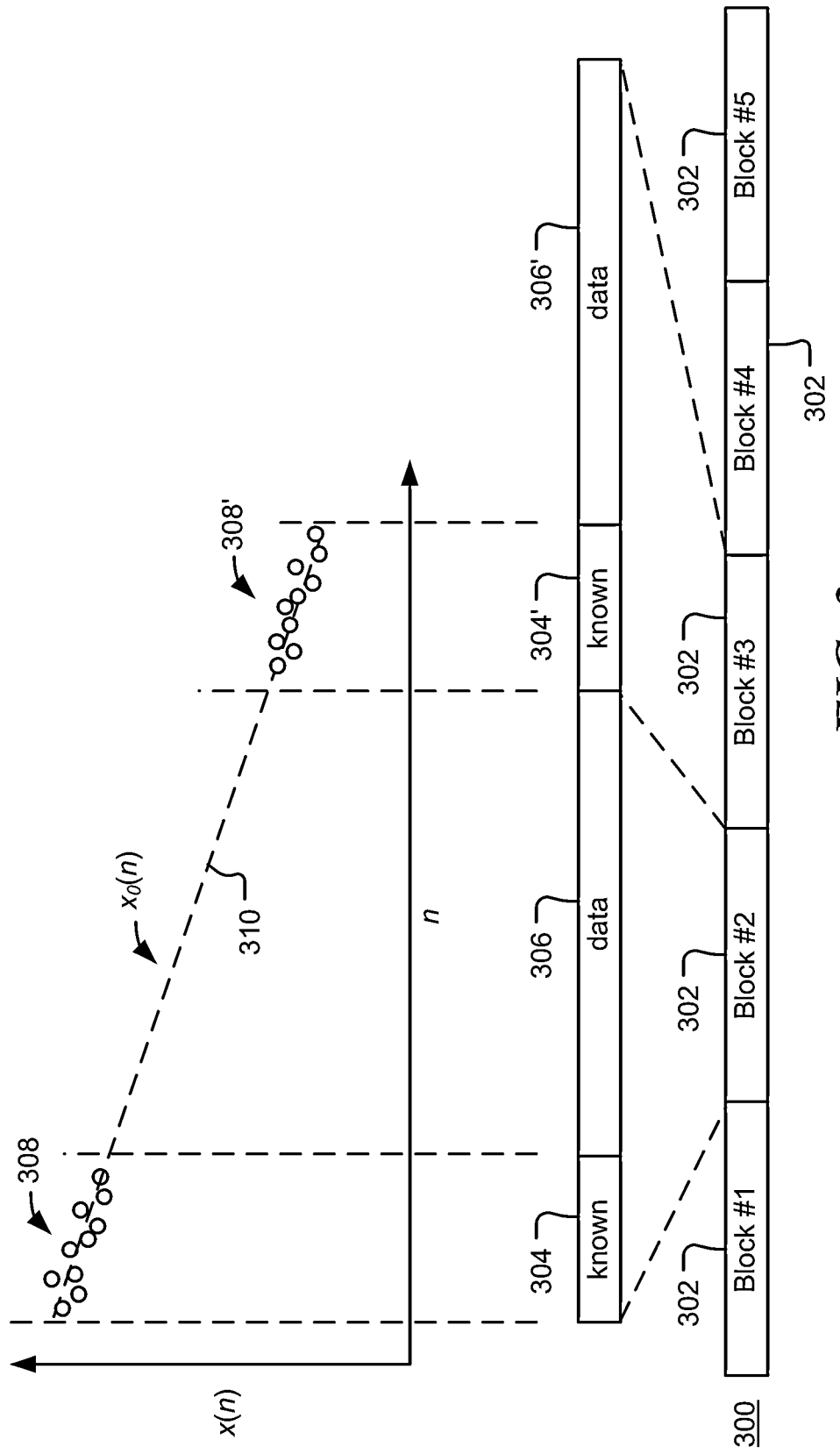
FIG. 3 is a diagram depicting initial estimation of phase noise, in accordance with certain embodiments of the invention.

FIG. 3 is a diagram depicting initial estimation of phase noise, in accordance with certain embodiments of the invention. Element 300 depicts a sequence of input values comprising a number of blocks 302. The sequence of input values may be received from a channel equalizer of a receiver subsystem, for example, and may contain complex data values. In the embodiment shown, each data block 302 includes a sequence of input values $y_{known}(n)$ (304, 304') that corresponds to known data symbols corrupted by phase noise, and a sequence of input values $y_{data}(n)$ (306, 306') that corresponds to unknown data symbols corrupted by phase noise. The known data symbols may be pilot signals, cyclic prefixes, or other data patterns. For example, IEEE 802.11ad SC-PHY packets use a known 64-symbol guard interval sequence and an unknown 448-symbol data sequence in each 512 symbol block. As discussed above, the phase noise values for sequences 304 and 304' are given by $$x(n) = y_{known}(n)/s(n), \quad (14)$$

where $s(n)$ is the known data symbol contained in the noisy input $y_{known}(n)$. These phase noise values are plotted as points 308 and 308' in graph shown in FIG. 3. Note that the values may be complex phasors, as given by equation (14), or the corresponding real phase angles. Only one component is shown in FIG. 3 for simplicity. From the phase noise values plotted as points 308 and 308', an initial estimate $x_0(n)$ may be made of phase noise values in the data sequence 306. For example, the estimate may be obtained by a linear fit of the data, as indicated by broken line 310 in the graph.

The initial, coarse, phase noise estimate is used for initial phase noise reduction. This initial noise reduction is aimed at improving the quality of the hard decisions of the data symbols. Other methods for determining initial phase noise estimates will be apparent to those of ordinary skill in the art. For example, the initial phase noise estimate can be found by averaging the phase noise estimates of the cyclic prefixes (CP's) (guard intervals in IEEE 802.11ad) at either ends of a data block, and then interpolating between the two estimates for each data symbol.

B. Exemplary Phase Noise Tracking and Estimation Module

Figure 4:
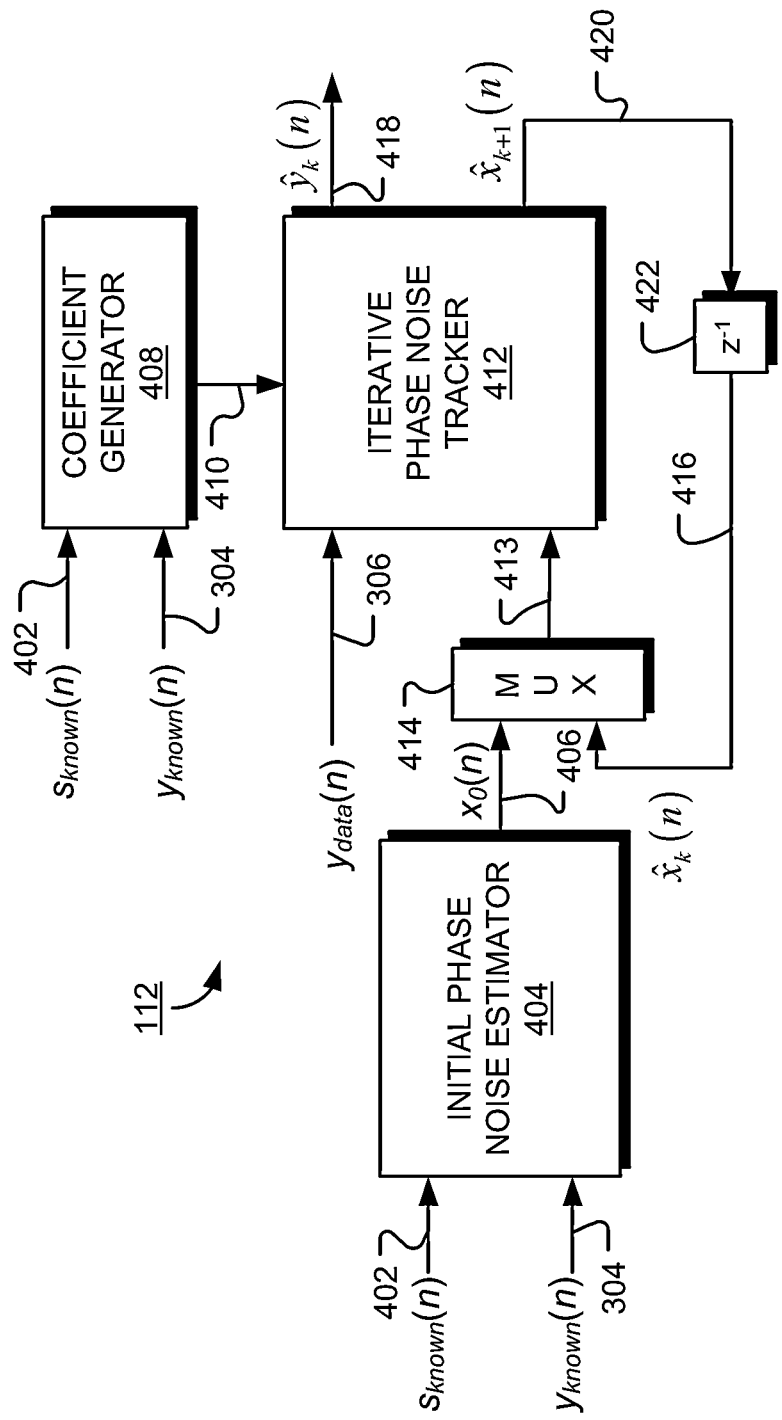
FIG. 4 is a block diagram of a phase noise tracking and estimation circuit, in accordance with exemplary embodiments of the disclosure.

FIG. 4 is a block diagram of a phase noise tracking and estimation module 112, in accordance with exemplary embodiments of the disclosure. The module 112 receives, as inputs, the sequences of input values $y_{known}(n)$ (304), that correspond to known data symbols (such as pilot signals or cyclic prefixes) corrupted by phase noise, and sequences of input values $y_{data}(n)$ (306) that correspond to unknown data symbols corrupted by phase noise. The known symbols $s_{known}(n)$ (402) are also provided as input or stored in a memory. An initial phase noise estimator 404 is responsive to the sequences 402 and 304 to provide initial noise phase estimates $x_0(n)$ (406), as described above, for example. A coefficient generator 408 is responsive to the sequences 402 and 304 to provide filter coefficients 410. Exemplary embodiments of the coefficient generator will be discussed in more detail below. The coefficients are supplied to iterative phase noise estimator and tracker 412. The iterative phase noise estimator 412 also receives phase noise values 413 from multiplexor or selector 414. The phase noise values may be the initial phase noise values 406 or previous filtered phase noise values 416. The phase noise estimator 412 operates on the input values $y_{data}(n)$ (306) that correspond to unknown data symbols corrupted by phase noise and produces, as output, compensated input values $\hat{y}_k(n)$ (418) and updated phase noise values $\hat{x}_{k+1}(n)$ (420). The updated phase noise values 420 are passed to delay unit 422 to provide previous phase noise values $\hat{x}_k(n)$ (416). Operation of part of the phase noise tracking and estimation module 112 may be performed iteratively on each block of input values until a selected termination condition is met. In this embodiment, the phase noise estimate 420 is fed-back through delay unit 422 and iteratively improved, however, the compensated input value 418, the quantized input and the phase noise estimate are directly related. Thus, any one of values could be iteratively improved. For example, in an alternative embodiment (discussed below with respect to FIGS. 9 and 10), the compensated input is iteratively improved.

C. Exemplary Iterative Phase Noise Tracker

Figure 5:
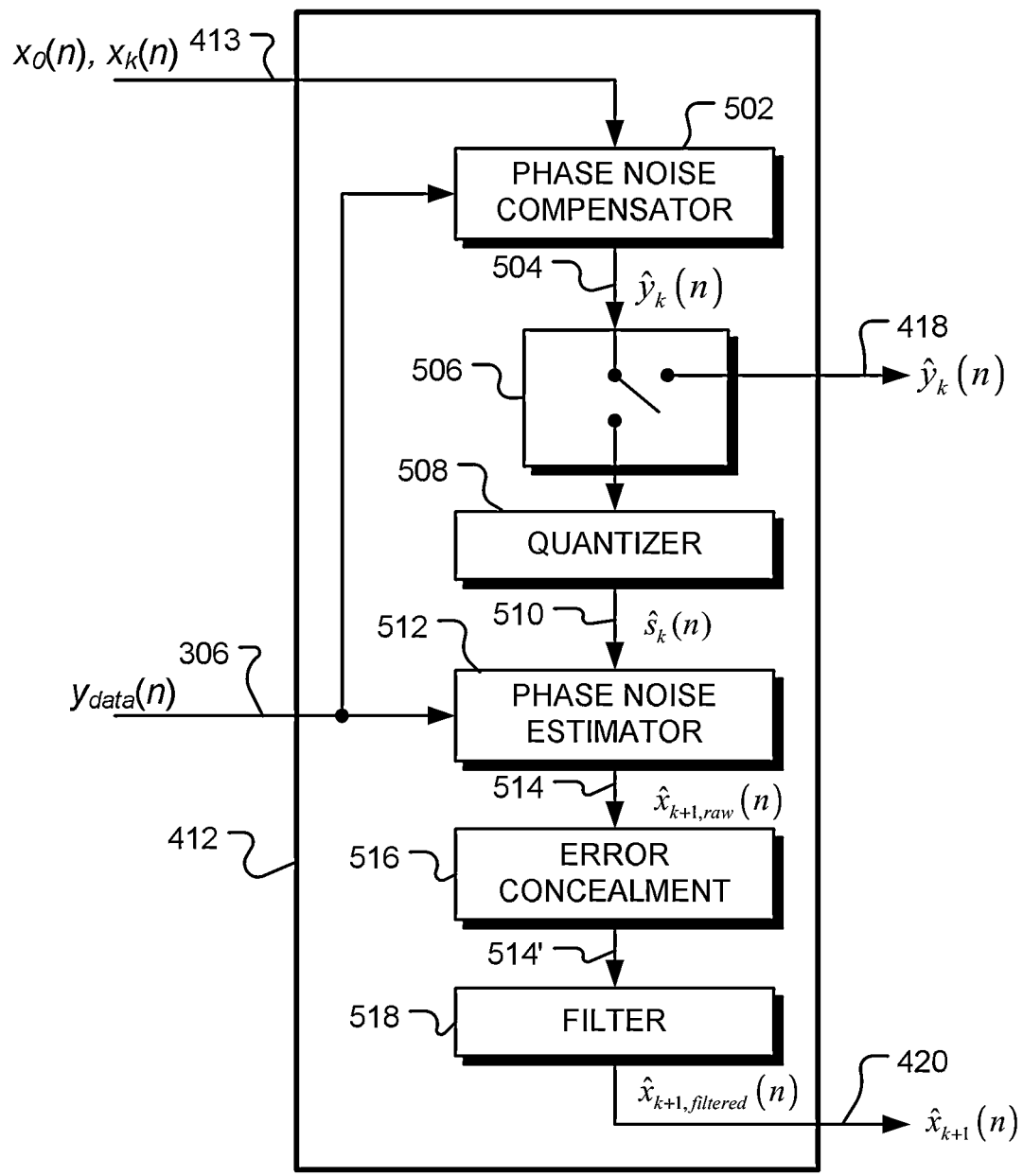
FIG. 5 is a block diagram of an iterative phase noise tracker, in accordance with exemplary embodiments of the present disclosure.

FIG. 5 is a block diagram of an iterative phase noise tracker 412, in accordance with exemplary embodiments of the present disclosure. The phase noise tracker 412 operates on the input values $y_{data}(n)$ (306) that correspond to unknown data symbols corrupted by phase noise and prior or initial phase noise estimates 413. It produces, as output, compensated input values $y_k(n)$ (418) and updated phase noise values $\hat{x}_{k+1}(n)$ (420). The prior or initial phase noise estimates 413 are passed to phase noise compensation module 502 which computes the compensated input value 504 as $$\hat{y}_k(n) = y(n)/\hat{x}_{k,filtered}(n) \tag{14}$$

If the compensated input value is not ready for output, the switch or selector 506 passes the compensated input value 504 to quantizer or hard decision module 508 that estimates the data symbol 510 as $$\hat{s}_k(n) = Q\{\hat{y}_k(n)\} \tag{15}$$

The raw phase noise 514 is updated in phase noise estimator 512 as $$\hat{x}_{k+1,raw}(n) = y(n)/\hat{s}_k(n) \tag{16}$$

and, after concealment of large errors in error concealment module 516, the raw phase noise is passed through filter 518 to provide filtered phase noise values 420, given by $$\hat{x}_{k+1,filtered}(n) = c^T x_k(n). \tag{17}$$

The updated filtered noise values may be passed through iterative phase noise estimate 412 one or more times. After a sufficient number of iterations, the compensated input 418 is provided as an output from switch 506. The number of iterations may be determined by monitoring changes in the estimated symbols 510. If the symbols are unchanged from one iteration to the next, the raw and filtered phase noise estimates will be unchanged and no further improvement is achieved by additional iterations. Alternatively, a fixed number of iterations may be used.

D. Exemplary Filter Coefficient Generation

In one embodiment, the phase noise filter is a joint forward and backward linear prediction filter (JFBLPF) that is designed to minimize the mean square error (MSE) of the prediction error $$E\{|e(n)|^2\} = E\{|\hat{x}(n) - x(n)|^2\}, \tag{18}$$

where E is the mathematical expectation operator. The resulting optimal filter coefficient vector c can readily be derived from the principle of orthogonality as $$c = R_x^{-1} q_x, \tag{19}$$

where $R_x$ and $q_x$ are, respectively, the autocorrelation matrix of x(n) and the correlation vector of x(n). It can be shown that the coefficients of c in (19) can be partitioned by (13) and are conjugate symmetrical, such that $$b(k) = a^*(k), k=1,2,\ldots,L. \tag{20}$$

The amount of computation in equation (19) may be reduced by calculating only half of the coefficients, such as the forward coefficient vector a, in the vector c. Writing the correlation vector and matrix in block forms gives $$q_x = E\{x(n)x^*(n)\} = [\tilde{q}_1^H, q_1^T]^T, \tag{21}$$

where the tilde mark (~) denotes the vector flipping operation, the superposed H denotes the conjugate transpose and $q_1$ is an autocorrelation vector of x(n) given by $$q_1 = [r(1), r(2), \ldots, r(L)]^T, \tag{22}$$

where $$r(m) = E\{x(n)x^*(n-m)\} \tag{23}$$

Equation (23) assumes that the phase noise is wide-sense stationary. The matrix $R_x$ in equation (19) is the autocorrelation matrix of the data vector x(n), and is given by $$R_x = E\{x^*(n)x^T(n)\} = \begin{bmatrix} R_1 & R_2^H \\ R_2 & R_1 \end{bmatrix}, \text{ in which} \tag{24}$$

$$R_1 = \begin{bmatrix} r(0) & r^*(1) & \cdots & r^*(L-1) \\ r(1) & r(0) & \cdots & r^*(L-2) \\ \cdots & \cdots & \ddots & \cdots \\ r(L-1) & r(L-2) & \cdots & r(0) \end{bmatrix}, \text{ and} \tag{25}$$

$$R_2 = \begin{bmatrix} r(L+1) & r(L) & \cdots & r(2) \\ r(L+2) & r(L+1) & \cdots & r(3) \\ \cdots & \cdots & \ddots & \cdots \\ r(2L) & r(2L-1) & \cdots & r(L+1) \end{bmatrix}. \tag{26}$$

Using the block matrix inversion lemma, equation (19) becomes $$c = \begin{bmatrix} b \\ a \end{bmatrix} = \begin{bmatrix} U_1 & -R_1^{-1} R_2^H U_2 \\ -R_1^{-1} R_2 U_1 & U_2 \end{bmatrix} \begin{bmatrix} \tilde{q}_1^* \\ q_1 \end{bmatrix} \tag{27}$$

and the vector of forward prediction coefficients can be computed as $$a = U_2 q_1 - R_1^{-1} R_2 U_1 \tilde{q}_1^*, \tag{28}$$

where $$U_1 = (R_1 - R_2^H R_1^{-1} R_2)^{-1} \tag{29}$$

and $$U_2 = (R_1 - R_2 R_1^{-1} R_2^H)^{-1} = R_1^{-1}(I + R_2 U_1 R_2^H R_1^{-1}) \tag{30}$$

It can be seen that the matrix inversion in equation (19) computed using equations (27) and (28) uses $2L^2$ operations, comparing to the $4L^2$ operations required for direct matrix inversion for a forward LPF or a backward LPF with the same order of 2L. In some applications, the order L of the filter may be low. In an example application, using three coefficients in each filter (L=3) achieved a satisfactory performance.

It is noted that both $R_1$ and $R_1 - R_2^H R_1^{-1} R_2$ in (29) are Hermitian matrices and their inversion can be efficiently done by numerically stable methods such as eigenvalue decomposition (EVD) or singular value decomposition (SVD). Given that the order of the matrices may be low (e.g. 3), the computation of the matrix inversions may be implemented on a smart mobile device, for example.

The autocorrelations r(m)'s in equation (22) are estimated from the phase noise samples x(n) from the inputs y(n) when the data symbols s(n) are known. One example is in a IEEE 802.11ad SC-PHY link, where the autocorrelations r(m) can be estimated from the phase noise values x(n) in the guard interval (GI) sections of a data packet. The autocorrelations may be estimated as $$\hat{r}(m) = \frac{1}{N_G} \sum_{k=0}^{N_G-m-1} x^*(k)x(k+m), m = 0, 1, \cdots, 2L-1, \quad (31)$$

where $N_G$ is number of symbols in the guard interval. Note that equation (31) is a biased form of autocorrelation estimate and other forms of estimation may be used. The autocorrelations $\hat{r}(m)$ can also be smoothed and averaged across multiple data blocks so as to reduce the variance of the estimate. Smoothing has an additional benefit of tracking the time-varying nature of the phase noise as the wide-sense stationary assumption given above may be only valid for a short period of time. One of the commonly used smoothing method is a one-pole infinite impulse response (IIR) filter, for which $$\hat{r}(m,p) = \alpha \hat{r}(m,p-1) + (1-\alpha)\hat{r}(m), \quad (32)$$

where p is the index of a data block in a packet and α is a design parameter related to the time-constant. The JFBLPF can be updated block by block, using the autocorrelation $\hat{r}(m,p)$ of the $p^{th}$ block.

As described above, the phase noise samples fed to the JFBLPF are determined from the data symbols in a block using data symbols s(n) estimated by making hard decisions on the data symbols. The hard decisions can be made by a minimum distance rule or maximum likelihood rule, for example.

E. Exemplary Error Concealment

The phase noise samples retrieved from the data symbols are subject to noise and errors such as decision errors, equalization residuals, etc. Even though the noise and errors in the samples will be reduced by the JFBLPF, outlier samples due to noise and symbol errors have a non-negligible impact on the phase noise estimates after the JFBLPF. Accordingly, an error concealment circuit may be implemented that first detects the outliers and then replaces them with the neutral values (zeros for real-valued phase angles and ones for complex phasors) and then changes them to the interpolated values of their neighboring samples.

One method of detecting an outlier is based on estimates of the samples mean and standard deviation (STD). A sample is considered an outlier if it is at a distance from the mean of more than d×STD, where d is a design parameter (e.g. 2.5). Another method of detecting an outlier is based on the log-likelihood-ratio (LLR) estimation for a symbol sample. The symbol LLR can be obtained along with a hard decision making circuit, where the symbol with the minimum distance from the symbols in the symbol set is chosen as the quantization or hard decision of the sample. The LLR of the symbol can be calculated, for example, as the difference of second minimum distance from the minimum distance. In this embodiment, a phase noise sample is considered as an outlier if it's corresponding symbol LLR is less than a threshold, for example, I×MinContDist, where I is a design parameter and MinContDist is the minimum distance of the constellation.

Figure 6:
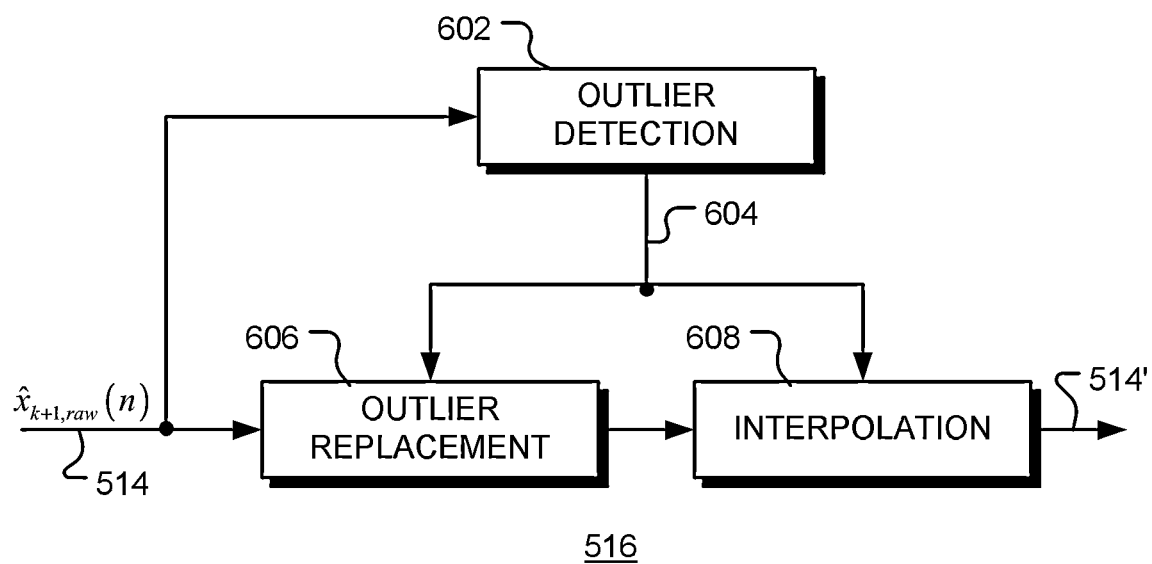
FIG. 6 is a block diagram of an error concealment circuit or module, in accordance with exemplary embodiments of the disclosure.

FIG. 6 is a block diagram of an error concealment circuit or module 516, in accordance with exemplary embodiments of the disclosure. In response to raw phase noise samples 514, sample outliers are detected in module 602, as discussed above, for example. The index or position of a outlier is passed to module 606 that replaces the corresponding value in the block by a neutral value (e.g. zero if the phase angle is being used, or 1 if the complex phasor is being used). Optionally, at module 608, the neutral values may be improved by the interpolation between their neighbouring samples (e.g., by linear interpolation). Finally, the phase noise sequence 514', with concealed errors, is provided as output. In one embodiment, outliers are replaced by median filtering of the raw phase noise signals.

F. Exemplary Complexity Reduction

The implementation and computation complexity of the approach discussed above may be alleviated by several considerations. The first one is the computation of the coefficients of the linear prediction filter (JFBLPF). As discussed above, the computation can be greatly reduced by considering the symmetry property of the JFBLPF and using the block matrix inversion rules. The computation can be further reduced by using two separate LPFs, a forward LPF (F-LPF) and a backward LPF (B-LPF), each with an order of L (FB-LPF).

A forward prediction of x(n) by an F-LPF can be expressed as $$\hat{x}_F(n) = \sum_{m=1}^{L} a(m)x(n-m), \quad (33)$$

and a backward prediction of x(n) by a B-LPF is given by $$\hat{x}_B(n) = \sum_{m=1}^{L} b(m)x(n+m). \quad (34)$$

The combined prediction of x(n) then can be written as $$\hat{x}(n) = \frac{1}{2}[\hat{x}_F(n) + \hat{x}_n(n)]. \quad (35)$$

The coefficients of an optimal F-LPF are given by $$a = R_1^{-1} q_1, \quad (36)$$

where $a = [a(1)\ a(2)\ \ldots\ a(M_1)]^T$, $R_1$ and $q_1$ are defined above. The coefficients may be efficiently calculated using Levinson-Durbin recursion, for example. The coefficients b(k) may be found from the a(k)'s using the symmetric property $b(k) = a^*(k)$.

Another consideration for the complexity reduction is the retrieval of phase noise samples from the data symbols. Representing the phase noise as complex phasors rather than real phase angles avoids the computation of trigonometric functions both before and after the filtering process, however, the filter process then uses complex arithmetic.

Finally, the iteration process may be invoked selectively—being used for certain higher order modulation and coding schemes, while simpler coarse phase noise reduction is used for lower order modulation and coding schemes.

V. Exemplary Performance Results

Figure 7:
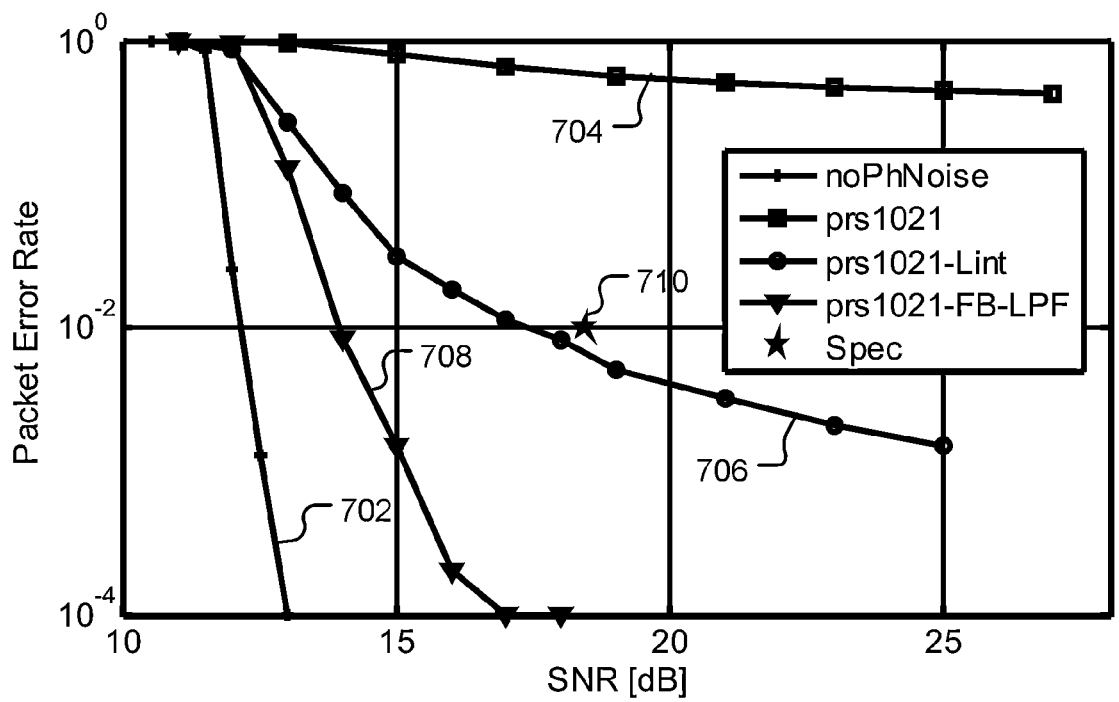
FIG. 7 is a graph depicting some example performance improvements resulting from phase noise mitigation, in accordance with an exemplary embodiment of the disclosure method.

FIG. 7 is a graph depicting some example performance improvements resulting from phase noise mitigation in accordance with an exemplary embodiment of the disclosure method. FIG. 7 shows the packet rate error (PER) of a receiver as a function of the signal to noise ratio (SNR) of the receiver signal measured in decibels. The results were obtained from a link level simulation of an IEEE 802.11ad SC-PHY link. To focus on the issue of phase noise, the propagation channel was chosen to be a pure line-of-sight, static channel. The packet size (PSDU) in the simulation was 4096 octets and 10,000 packets were simulated for each of the SNR points. Results are shown for MCS-12 (16QAM, ¾ code rate).

Figure 8:
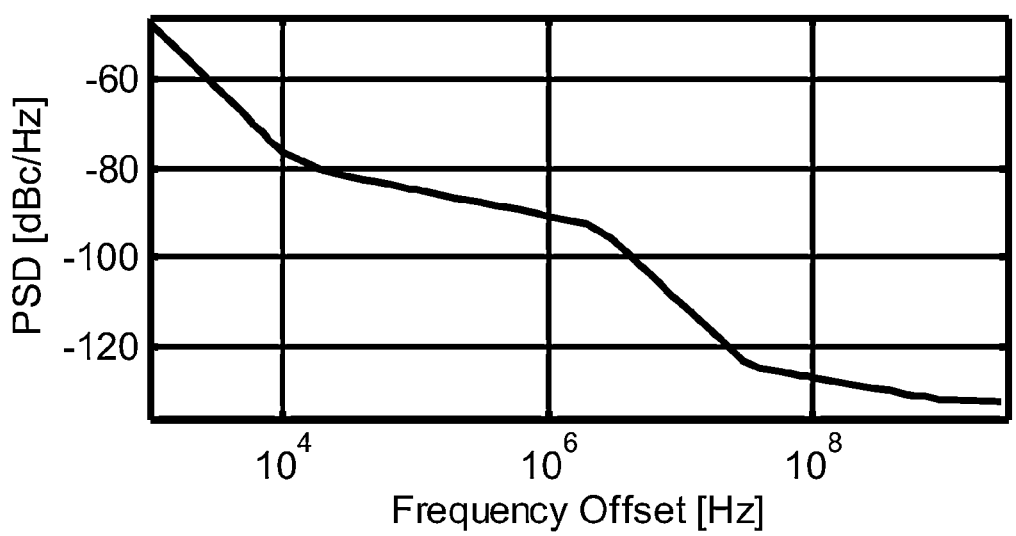
FIG. 8 is a graph of the power spectral density of an exemplary phase noise sequence.

Plot 702 shows the performance when no phase noise is present (only additive noise). Performance is good even at low SNR levels, where the signals are very noisy. In contrast, when phase noise is present, as shown in plot 704, the performance is poor even at high SNR levels. The phase noise model used in the simulation has a power spectral density (PSD) as shown in FIG. 8.

When simple phase noise reduction is applied, such as the linear interpolation discussed above in reference to FIG. 3, the performance is improved, as depicted by the plot 706. However, the performance barely meets the minimum performance specified in the IEEE 802.11ad standard (as depicted by star 710).

Plot 708 show the performance when the phase noise is filtered through a joint forward-backward linear prediction filter (JFBLPF) with error concealment, with parameters set as: L=3; α=0.8; d=2.5. The maximum number of iterations is 3 and the termination of the iterations is based on a check of hard decisions between two consecutive iterations. When the performance is evaluated as the required SNR to achieve a 1% packet error rate (PER), the mitigation provides a gain of 3.5 dB in SNR over simple coarse phase noise reduction.

Figure 9:
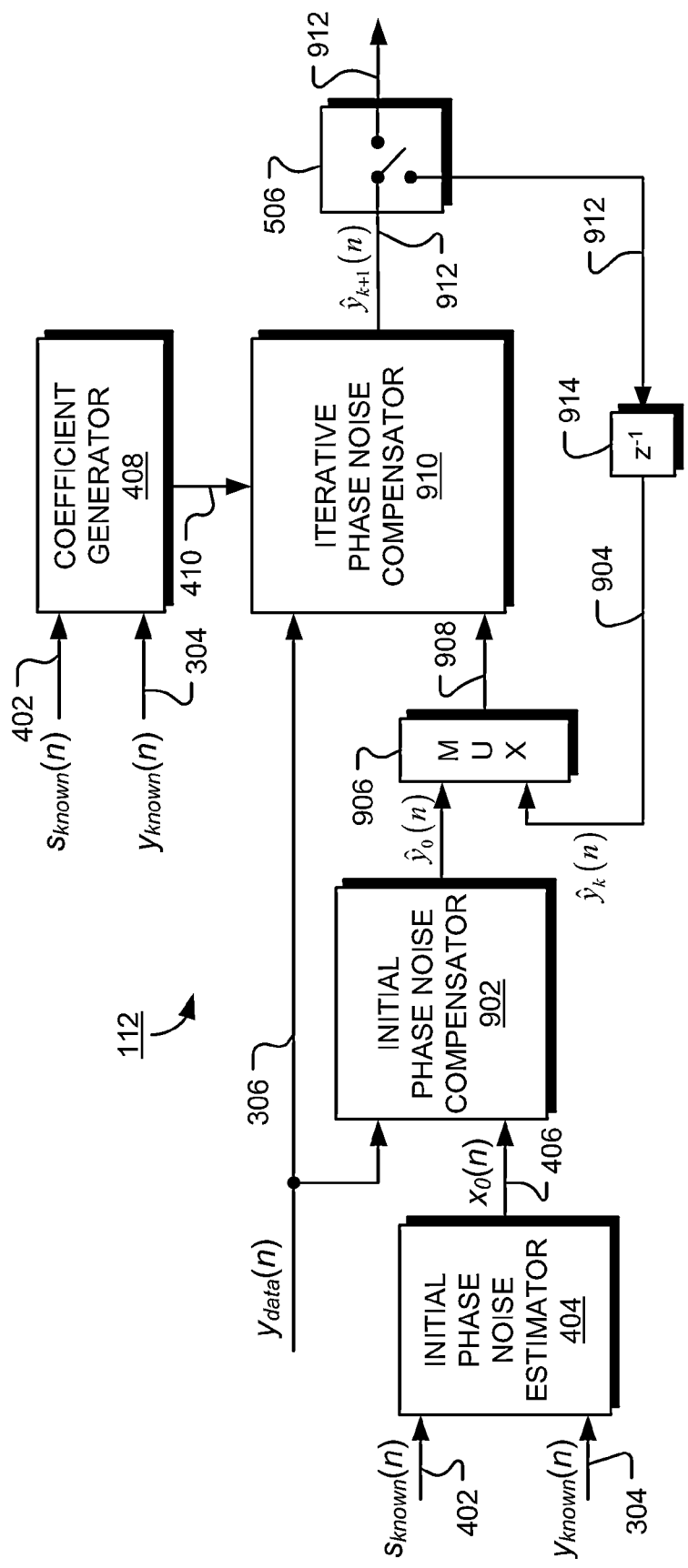
FIG. 9 is a block diagram of a phase noise tracking and estimation module, in accordance with exemplary embodiments of the disclosure.

FIG. 9 is a block diagram of a phase noise tracking and estimation module 112, in accordance with exemplary embodiments of the disclosure. It will be apparent that iteration of the processing elements described by equations (14)-(17) may begin at any element, provided appropriate pre-processing is performed. For example, the initial phase noise compensation described by equation (14) may be performed outside of the iteration loop, as shown in FIG. 9. In FIG. 9, initial phase noise compensation is performed in module 902 to provide an initial compensated input $\hat{y}_0(n)$. If an updated compensated input $\hat{y}_k(n)$ (904) exists, multiplexer 906 selects the updated input, otherwise the multiplexer 906 selects the initial compensated input, $\hat{y}_0(n)$. The selected compensated input 908 is passed to iterative phase noise compensation module 910 that iteratively updates the compensated input to produce updated compensated input $\hat{y}_{k+1}(n)$ (912). If the termination condition is not met, the switch or selector 506 passes the compensated input $\hat{y}_{k+1}(n)$ to delay unit 914 in preparation for the next iteration. Otherwise, if the termination condition is met, the switch or selector 506 provides the compensated input $\hat{y}_{k+1}(n)$ as output from the phase noise tracking and estimation module 112.

Figure 10:
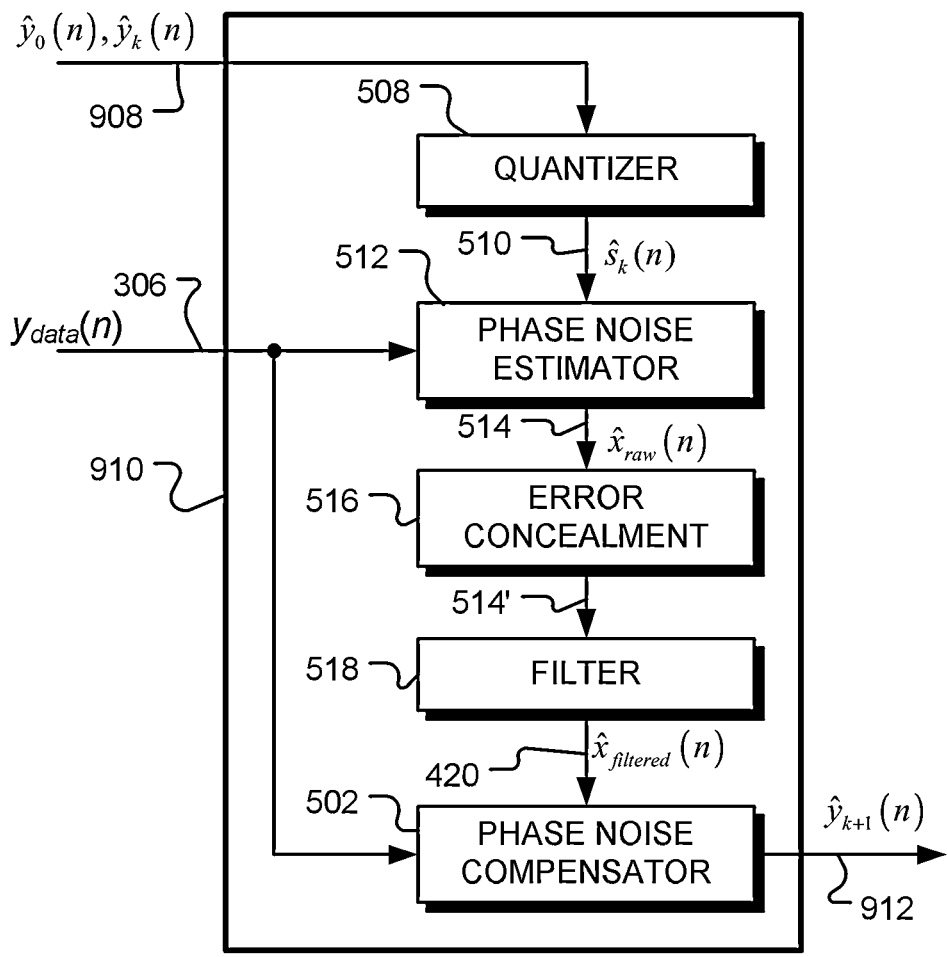
FIG. 10 is a block diagram of an iterative phase noise compensator, in accordance with exemplary embodiments of the present disclosure.

FIG. 10 is a block diagram of an iterative phase noise compensator 910, in accordance with exemplary embodiments of the present disclosure. The phase noise compensator 910 operates on the input values $y_{data}(n)$ (306) that correspond to unknown data symbols corrupted by phase noise and prior or initial compensated inputs 908. It produces, as output, updated compensated input values $y_{k+1}(n)$ (912). The prior or initial compensated inputs 908 are passed to quantizer or hard decision module 508 that estimates the data symbols $\hat{s}_k(n)$ (510). The raw phase noise $\hat{x}_{raw}(n)$ (514) is calculated in phase noise estimator 512 and, after concealment of large errors in error concealment module 516, the error-concealed raw phase noise 514' is passed through filter 518 to provide filtered phase noise value $\hat{x}_{filtered}(n)$ (420). This is used in phase noise compensation module 502 to compute the updated compensated input value $\hat{y}_{k+1}(n)$ (912).

The updated compensated input values may be passed through iterative phase noise compensator 910 one or more times. After a sufficient number of iterations, the updated compensated input 912 is provided as an output. The number of iteration may be determined by monitoring changes in the estimated symbols 510.

It is noted that the elements shown in FIGS. 9 and 10 are equivalent to those in FIGS. 4 and 5. The method and apparatus for phase noise mitigation in wireless communications system, of which exemplary embodiments are disclosed above, may to be executed in a wireless receiver. In some embodiments, the method includes the sequential steps of received packet synchronization, channel estimation, equalization, phase noise tracking and mitigation, and demodulation and decoding. The phase noise tracking and mitigation uses an iterative process to eliminate phase noise from both the transmitting side and the receiving side of the wireless communication system, without employing prior stochastic information about the phase noise properties.

Variations in phase noise may be tracked by estimating autocorrelation matrices of the phase noise samples retrieved from a known data part in a data stream.

In exemplary embodiments, the disclosed phase noise tracking and mitigation constitutes an iterative process of making hard decisions for data symbols, retrieving phase noise samples, concealing errors in phase noise samples, filtering the phase noise samples using joint a forward and backward linear prediction filter (JFBLPF), and removing phase noise from the data symbols using filtered phase noise samples. The iterative process requires only one time per data block estimation of the autocorrelation matrices and coefficients of the JFBLPF, and can be terminated based on satisfaction of one or more given criteria.

Computation complexity may be reduced by applying reduced-dimension matrix inversion for calculation of the coefficients of the JFBLPF or by using separate forward and backward linear prediction filters (FB-LPF).

Performance is improved by applying an error concealment process, in which unreliable and outlier phase noise samples are replaced first by neutral values and then by the interpolated values of their neighbouring samples.

The method may be implemented, for example, on a programmed processor, in custom logic circuits, in programmable gate arrays, or any combination thereof. It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

VI. Exemplary Method

An exemplary method for reducing phase noise in a communication receiver includes receiving a first sequence of input values, each input value comprising an unknown data symbol corrupted by phase noise. For one or more iterations until a termination condition is met, a sequence of data symbols is determined from the first sequence of input values, a sequence of raw phase noise values is determined from the first sequence of input values and the sequence of data symbols, the sequence of raw phase noise values is filtered to provide a sequence of filtered phase noise values, and the first sequence of input values is compensated using the sequence of filtered phase noise values to provide a sequence of compensated input values that may output for further processing.

The sequence of raw phase noise values may be filtered through a prediction filter, such as a forward prediction filter, a backward prediction filter or a combination of a forward prediction filer and a backward prediction filter.

The exemplary method may also include receiving a second sequence of input values, each input value comprising a known data symbol corrupted by phase noise, and determining coefficients of the prediction filter dependent upon the second sequence of input values and the known data symbols.

At a first iteration of the one or more iterations, determining the sequence of data symbols from the first sequence of input values may include receiving (prior to receiving the first sequence of inputs values) a second sequence of input values containing known data symbols corrupted by phase noise, and receiving (after receiving the first sequence of inputs values) a third sequence of input values comprising known data symbols corrupted by phase noise. The initial phase noise values of the second and third sequences of input values are determined and used to compensate the first sequence of input values dependent to provide a sequence of compensated input values. The sequence of data symbols is then estimated from the sequence of compensated input values.

In an embodiment, determining a sequence of raw phase noise values from the first sequence of input values and the sequence of data symbols includes dividing an input value of the first sequence of input values by a corresponding data symbol of the sequence of data symbols to provide a complex phasor.

Determining the sequence of raw phase noise values from the first sequence of input values and the sequence of data symbols may also include replacing outlier raw phase noise values from the sequence of raw phase noise values with modified phase noise values.

Determining a sequence of raw phase noise values from the first sequence of input values and the sequence of data symbols may also include determining a real-valued phase angle of the complex phasor.

It is noted that filtering the sequence of raw phase noise values to provide a sequence of filtered phase noise values may be independent of any prior knowledge of phase noise properties.

In one embodiment, the termination condition is met if the sequence of data symbols determined from the sequence of first input values is unchanged from one iteration to the next.

The first sequence of input values may be received from a channel equalizer, and the sequence of compensated input values may be output to a channel decoder.

VII. Exemplary Systems

An exemplary embodiment provides a communication receiver having a phase noise tracking and mitigation circuit that includes a quantizer, a phase-noise estimator, an error concealment module, a filter and a phase-noise compensator. The quantizer determines data symbols from noise-compensated input values, while the phase noise estimator determines raw phase noise values from the data symbols and a first sequence of uncompensated input values. The filter operates on the raw phase noise values to produce filtered phase noise values; and the phase-noise compensator determines noise-compensated output values dependent upon the filtered phase noise values and the first sequence of uncompensated input values.

The noise-compensated input values may be prior noise-compensated output values, for example.

The communication receiver may also include a delay unit operable to receive the filtered phase noise values as input and provide delayed filtered noise values to the phase noise compensator and/or an initial phase noise estimator. The initial noise estimator provides initial phase noise values in response to a second sequence of input values (received before the first sequence and corresponding to known symbols) and a third sequence of input values (received after the first sequence and corresponding to known symbols).

The initial phase noise estimator may determine an interpolation between phase noise values determined from the second sequence and phase noise values determined from the third sequence.

The communication receiver may also include a coefficient generator that provides coefficients of the filter in response to phase noise values determined from a second sequence of input values corresponding to known symbols.

When the filter is a prediction filter, the coefficient generator determines coefficients of the prediction filter dependent upon estimated auto-correlation values of the phase noise values determined from the second and/or the third sequence of input values. The estimated auto-correlation values may be updated block by block recursively, to enable changes in phase noise characteristics to be tracked.

The prediction filter may include a forward prediction filter, a backward prediction filter, or a combination of a forward prediction filer and a backward prediction filter.

An error concealment module may be included to conceal outlier errors in the raw phase noise values and produce error-concealed phase noise values. In this embodiment, the filter operates on the error-concealed raw phase noise values to produce the filtered phase noise values.

The input signal path of the communication receiver may include a receiver front-end, a packet synchronizer, a channel estimator, and a channel equalizer, configured such that the phase noise tracking and mitigation circuit receives input from the channel equalizer. The communication receiver may also include a symbol demodulator and decoder, where the phase noise tracking and mitigation circuit provides the output to the symbol demodulator and decoder.

The communication receiver may be incorporated in a mobile device, such as handheld electronic device, PDA, user equipment, smart watch, cell phone, smart phone, laptop, notebook, web-book, net-book, tablet computer or other wireless communication device.

Some aspects and features of the disclosed phase noise tracking and mitigation means are set out in the following numbered items:

1. A communication receiver having a phase noise tracking and mitigation means comprising:
   tracking means for determining phase noise auto-correlation values from a second and/or third sequence corresponding to known symbols;
   quantizing means for determining data symbols from noise-compensated input values;
   phase noise estimating means for determining raw phase noise values from the data symbols and a first sequence of uncompensated input values;
   filter means for filtering the raw phase noise values to produce filtered phase noise values; and
   a phase-noise compensating means for determining noise-compensated output values dependent upon the filtered phase noise values and the first sequence of uncompensated input values.

2. The communication receiver of item 1, where the noise-compensated input values comprise prior noise-compensated output values.
3. The communication receiver of item 1, further comprising means for delaying the filtered phase noise values to provide delayed filtered noise values to the phase noise compensating means.
4. The communication receiver of item 1, further comprising:
    initial phase noise estimating means for providing initial phase noise values in response to:
        a second sequence of input values corresponding to known symbols, the second sequence received before the first sequence, and
        a third sequence of input values corresponding to known symbols, the third sequence received after the first sequence.
5. The communication receiver of item 4, where the initial phase noise estimating means is operable to determine an interpolation between phase noise values determined from the second sequence and phase noise values determined from the third sequence.
6. The communication receiver of item 1, further comprising:
    coefficient generating means for providing coefficients of the filter means in response to phase noise values determined from a second sequence of input values corresponding to known symbols.
7. The communication receiver of item 6, where the filter means comprises a prediction filter and where the coefficient generating means is operable to determine coefficients of the prediction filter dependent upon estimated auto-correlation values of the phase noise values determined from the second and/or the third sequence of input values.
8. The communication receiver of item 7, where the estimated auto-correlation values are updated block by block recursively to track changes in phase noise characteristics.
9. The communication receiver of item 7, where the prediction filter comprises one or more of a forward prediction filter, a backward prediction and a combination of a forward prediction filer and a backward prediction filter.
10. The communication receiver of item 1, further comprising:
    an error concealment means for concealing outlier errors in the raw phase noise values, to produce error-concealed phase noise values,
where the filter means operates on the error-concealed raw phase noise values to produce the filtered phase noise values.
11. The communication receiver of item 1, having an input signal path comprising:
    a receiver front-end, packet synchronizing means, channel estimation means, and channel equalization means,
where the phase noise tracking and mitigation means receives input from the channel equalization means, the communication receiver further comprising:
    symbol demodulating and decoding means,
where the phase noise tracking and mitigation means provides output to the symbol demodulating and decoding means.
12. A handheld electronic device incorporating the communication receiver of item 1.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described embodiments may be combined to create alternative embodiments not explicitly shown and described herein.

The present disclosure may be embodied in other specific forms without departing from its spirit or essential characteristics. The described exemplary embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:
1. A method for reducing phase noise in a communication receiver, the method comprising:
    receiving a first sequence of input values, each input value comprising an unknown data symbol corrupted by phase noise;
    determining a first sequence of data symbols from the first sequence of input values;
    determining a sequence of raw phase noise values from both the first sequence of input values and the first sequence of data symbols;
    filtering the sequence of raw phase noise values to provide a first sequence of filtered phase noise values; and
    compensating the first sequence of input values using the first sequence of filtered phase noise values to provide a sequence of compensated input values;
    for one or more iterations until a termination condition is met, performing the elements:
        determining a second sequence of data symbols from the sequence of compensated input values;
        determining a new sequence of raw phase noise values from both the sequence of compensated input values and the second sequence of data symbols;
        filtering the new sequence of raw phase noise values to provide a second sequence of filtered phase noise values; and
        compensating the first sequence of input values using the second sequence of filtered phase noise values to update the sequence of compensated input values; and
    outputting the updated sequence of compensated input values.
2. The method of claim 1, where the filtering the sequence of raw phase noise values comprises:
    filtering the sequence of raw phase noise values through a prediction filter.
3. The method of claim 2, where the prediction filter comprises one or more of a forward prediction filter, a backward prediction filter and a combination of a forward prediction filter and a backward prediction filter.
4. The method of claim 1, where, at a first iteration of the one or more iterations, determining the first sequence of data symbols from the first sequence of input values comprises:
    prior to receiving the first sequence of input values, receiving a second sequence of input values comprising known data symbols corrupted by phase noise;

after receiving the first sequence of input values, receiving a third sequence of input values comprising known data symbols corrupted by phase noise;

determining initial phase noise values of the second and third sequences of input values;

compensating the first sequence of input values dependent upon the initial phase noise values to provide a sequence of compensated input values; and estimating the sequence of data symbols from the sequence of compensated input values.

5. The method of claim 1, where the termination condition is met if the sequence of data symbols determined from the sequence of first input values is unchanged from one iteration to the next.

6. A method for reducing phase noise in a communication receiver, the method comprising:

receiving a first sequence of input values, each input value comprising an unknown data symbol corrupted by phase noise;

for one or more iterations until a termination condition is met, performing the elements:

determining a sequence of data symbols from the first sequence of input values;

determining a sequence of raw phase noise values from both the first sequence of input values and the sequence of data symbols;

filtering the sequence of raw phase noise values to provide a sequence of filtered phase noise values; and compensating the first sequence of input values using the sequence of filtered phase noise values to provide a sequence of compensated input values; and outputting the sequence of compensated input values, the method further comprising:

receiving a second sequence of input values, each input value comprising a known data symbol corrupted by phase noise; and determining coefficients of the prediction filter dependent upon the second sequence of input values and the known data symbols, where the filtering the sequence of raw phase noise values comprises filtering the sequence of raw phase noise values through a prediction filter.

7. A method for reducing phase noise in a communication receiver, the method comprising:

receiving a first sequence of input values, each input value comprising an unknown data symbol corrupted by phase noise;

for one or more iterations until a termination condition is met, performing the elements:

determining a sequence of data symbols from the first sequence of input values;

determining a sequence of raw phase noise values from both the first sequence of input values and the sequence of data symbols;

filtering the sequence of raw phase noise values to provide a sequence of filtered phase noise values; and compensating the first sequence of input values using the sequence of filtered phase noise values to provide a sequence of compensated input values; and outputting the sequence of compensated input values, where determining the sequence of raw phase noise values from the first sequence of input values and the sequence of data symbols comprises:

dividing an input value of the first sequence of input values by a corresponding data symbol of the sequence of data symbols to provide a complex phasor.

8. The method of claim 7, where determining the sequence of raw phase noise values from the first sequence of input values and the sequence of data symbols further comprises:

replacing outlier raw phase noise values from the sequence of raw phase noise values with modified phase noise values.

9. The method of claim 7, where determining the sequence of raw phase noise values from the first sequence of input values and the sequence of data symbols further comprises:

determining a phase angle of the complex phasor.

10. A communication receiver having a phase noise tracking and mitigation circuit comprising:

a quantizer operable to determine data symbols from noise-compensated input values;

a phase noise estimator, operable to determine raw phase noise values from the data symbols and a first sequence of uncompensated input values, where a raw phase noise value is determined as a ratio of an uncompensated input value of the sequence of uncompensated input values to a corresponding data symbol;

a filter operable to filter the raw phase noise values to produce filtered phase noise values; and a phase-noise compensator, operable to determine noise-compensated output values dependent upon the filtered phase noise values and the first sequence of uncompensated input values.

11. The communication receiver of claim 10, where the noise-compensated input values comprise prior noise-compensated output values and where the phase noise estimator is further operable update the raw phase noise values dependent upon the noise-compensated input values the data symbols determined therefrom.

12. The communication receiver of claim 10, further comprising a delay unit operable to receive the filtered phase noise values as input and provide delayed filtered noise values to the phase noise compensator.

13. The communication receiver of claim 10, further comprising:

an error concealment module, operable to conceal outlier errors in the raw phase noise values, to produce error-concealed phase noise values, where the filter operates on the error-concealed raw phase noise values to produce the filtered phase noise values.

14. A mobile device incorporating the communication receiver of claim 10, the mobile device having an input signal path comprising:

a receiver front-end;
a packet synchronizer;
a channel estimator; and
a channel equalizer;
where the phase noise tracking and mitigation circuit receives input from the channel equalizer,
the communication receiver further comprising:
a symbol demodulator and decoder,
where the phase noise tracking and mitigation circuit provides output to the symbol demodulator and decoder.

15. A communication receiver having a phase noise tracking and mitigation circuit comprising:

a quantizer operable to determine data symbols from noise-compensated input values;

a phase noise estimator, operable to determine raw phase noise values from the data symbols and a first sequence of uncompensated input values;

a filter operable to filter the raw phase noise values to produce filtered phase noise values; and a phase-noise compensator, operable to determine noise-compensated output values dependent upon the filtered phase noise values and the first sequence of uncompensated input values, the communication receiver further comprising:

an initial phase noise estimator, operable to provide initial phase noise values in response to:

a second sequence of input values corresponding to known symbols, the second sequence received before the first sequence, and a third sequence of input values corresponding to known symbols, the third sequence received after the first sequence, the initial phase noise estimator operable to determine an interpolation between phase noise values determined from the second sequence and phase noise values determined from the third sequence.

16. The communication receiver of claim 15, further comprising:

a coefficient generator, operable to provide coefficients of the filter in response to phase noise values determined from the second sequence of input values corresponding to known symbols.

17. The communication receiver of claim 16, where the filter comprises a prediction filter and where the coefficient generator is operable to determine coefficients of the prediction filter dependent upon estimated auto-correlation values of the phase noise values determined from the second sequence of input values, the third sequence of input values, or both the second and third sequences of input values.

18. The communication receiver of claim 16, where the prediction filter comprises one or more of a forward prediction filter, a backward prediction filter and a combination of a forward prediction filter and a backward prediction filter.

* * * * *